United States Patent
Takeyama et al.

(10) Patent No.: US 12,451,478 B2
(45) Date of Patent: Oct. 21, 2025

(54) METAL POROUS BODY

(71) Applicants: Sumitomo Electric Industries, Ltd., Osaka (JP); Sumitomo Electric Toyama Co., Ltd., Imizu (JP)

(72) Inventors: Tomoharu Takeyama, Osaka (JP); Kazuki Okuno, Osaka (JP); Mitsuyasu Ogawa, Osaka (JP); Akihisa Hosoe, Osaka (JP); Hitoshi Tsuchida, Imizu (JP); Masatoshi Majima, Imizu (JP); Junichi Nishimura, Imizu (JP); Akihiro Fujimaki, Imizu (JP)

(73) Assignees: Sumitomo Electric Industries, Ltd., Osaka (JP); Sumitomo Electric Toyama Co., Ltd., Imizu (JP)

( * ) Notice: Subject to any disclaimer, the term of this patent is extended or adjusted under 35 U.S.C. 154(b) by 0 days.

(21) Appl. No.: 18/274,880

(22) PCT Filed: Jan. 20, 2023

(86) PCT No.: PCT/JP2023/001753
§ 371 (c)(1),
(2) Date: Jul. 28, 2023

(87) PCT Pub. No.: WO2023/181613
PCT Pub. Date: Sep. 28, 2023

(65) Prior Publication Data
US 2025/0023014 A1      Jan. 16, 2025

(30) Foreign Application Priority Data

Mar. 24, 2022 (JP) ................................ 2022-048338

(51) Int. Cl.
| | | |
|---|---|---|
| *H01M 4/134* | (2010.01) | |
| *H01M 4/02* | (2006.01) | |
| *H01M 4/1395* | (2010.01) | |

(52) U.S. Cl.
CPC ......... *H01M 4/134* (2013.01); *H01M 4/1395* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2020/0350600 A1    11/2020  Numata et al.

FOREIGN PATENT DOCUMENTS

| | | |
|---|---|---|
| JP | 61-117182 A | 6/1986 |
| JP | 2012-111988 A | 6/2012 |
| WO | 2012/111601 A1 | 8/2012 |
| WO | 2014/024781 A1 | 2/2014 |
| WO | 2019/244480 A1 | 12/2019 |

*Primary Examiner* — Xiaobei Wang
(74) *Attorney, Agent, or Firm* — Volpe Koenig

(57) ABSTRACT

A metal porous body includes: a metal framework; and a separation wall formed in one piece with the metal framework, the separation wall being composed of the same material as a material of the metal framework. A plurality of cells each having a polyhedral shape exist inside the metal porous body. A side of the polyhedral shape is constituted of the metal framework. A location in which an opening of a cell of the plurality of cells is closed by the separation wall exists inside the metal porous body, the opening being defined by a side of a polyhedral shape of the cell.

8 Claims, 9 Drawing Sheets

METAL POROUS BODY

TECHNICAL FIELD

The present disclosure relates to a metal porous body. The present application claims a priority based on Japanese Patent Application No. 2022-048338, filed on Mar. 24, 2022. The entire contents of the Japanese patent application are incorporated herein by reference.

BACKGROUND ART

For example, WO 2019/244480 (PTL 1) describes a metal porous body. The metal porous body described in PTL 1 has a metal framework having a three-dimensional mesh structure. The metal framework is hollow. Inside the metal porous body described in PTL 1, a plurality of communicating pores defined by the metal framework exist.

CITATION LIST

Patent Literature

PTL 1: WO 2019/244480

SUMMARY OF INVENTION

A metal porous body of the present disclosure includes: a metal framework; and a separation wall formed in one piece with the metal framework, the separation wall being composed of the same material as a material of the metal framework. A plurality of cells each having a polyhedral shape exist inside the metal porous body. A side of the polyhedral shape is constituted of the metal framework. A location in which an opening of a cell of the plurality of cells is closed by the separation wall exists inside the metal porous body, the opening being defined by a side of a polyhedral shape of the cell.

DETAILED DESCRIPTION

Figure 1:
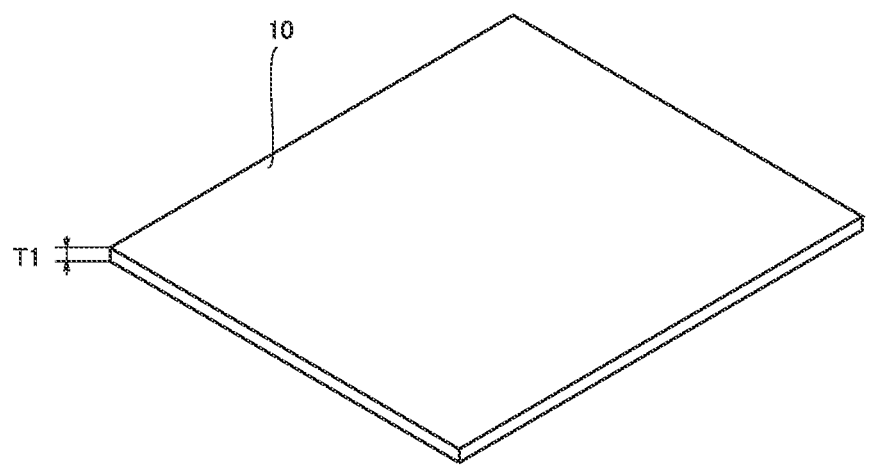
FIG. 1 is a perspective view of a metal porous body 10.

Problem to be Solved by the Present Disclosure

The metal porous body described in PTL 1 may have insufficient rigidity because pores existing inside the metal porous body are communicating pores. The present disclosure has been made in view of such a problem of the conventional art. More specifically, the present disclosure provides a metal porous body to attain improved rigidity.

Advantageous Effect of the Present Disclosure

According to the metal porous body of the present disclosure, rigidity of a metal porous body can be improved.

Description of Embodiments

First, embodiments of the present disclosure are listed and described.

(1) A metal porous body according to an embodiment includes: a metal framework; and a separation wall formed in one piece with the metal framework, the separation wall being composed of the same material as a material of the metal framework. A plurality of cells each having a polyhedral shape exist inside the metal porous body. A side of the polyhedral shape is constituted of the metal framework. A location in which an opening of a cell of the plurality of cells is closed by the separation wall exists inside the metal porous body, the opening being defined by a side of a polyhedral shape of the cell. According to the metal porous body of (1), rigidity of the metal porous body can be improved.

(2) In the metal porous body of (1), a metal layer of the metal framework may be composed of a metal material having a Vickers hardness of less than 600 Hv. According to the metal porous body of (2), rigidity of the metal porous body can be secured even when the metal framework is composed of a soft metal material.

(3) In the metal porous body of (1), a metal layer of the metal framework may be composed of a metal material having a Vickers hardness of 350 Hv or less. According to the metal porous body of (3), rigidity of the metal porous body can be secured even when the metal framework is composed of a soft metal material.

(4) In the metal porous body of (1), a metal layer of the metal framework may be composed of a metal material having a Vickers hardness of 100 Hv or less. According to the metal porous body of (3), rigidity of the metal porous body can be secured even when the metal framework is composed of a soft metal material.

(5) In the metal porous body of (2), a thickness of the metal layer may be 0.3 µm or more and 10 µm or less.

(6) In the metal porous body of (1) to (5), the metal framework may be composed of tin and a content of the tin may be 99.99 mass % or more. The metal porous body of (5) can be used for various purposes of use, such as a filter, an oil mist collector, a battery, an electrolytic electrode, a fuel cell electrode, a catalyst carrier, an electromagnetic wave shield, a noise reduction material, a humidification base material, and a shock absorbing material, each of which requires heat resistance.

(7) In the metal porous body of (1) to (6), a metal layer of the metal framework may be constituted of a layer of calcined tin particles. The metal porous body of (4) can be used for various purposes of use, such as a filter, an oil mist collector, a battery, an electrolytic electrode, a fuel cell electrode, a catalyst carrier, an electromagnetic wave shield, a noise reduction material, a humidification base material, and a shock absorbing material, each of which requires heat resistance.

Details of Embodiments of the Present Disclosure

Next, details of embodiments of the present disclosure will be described with reference to figures. In the figures described below, the same or corresponding portions are denoted by the same reference characters and the same explanation will not be described repeatedly. The metal porous body according to the embodiment is referred to as a metal porous body 10.

(Configuration of Metal Porous Body 10)

A configuration of a metal porous body 10 will be described below.

FIG. 1 is a perspective view of metal porous body 10. As shown in FIG. 1, metal porous body 10 is in the form of, for example, a sheet. The thickness of metal porous body 10 is defined as a thickness T1. Thickness T1 is, for example, 0.1 mm or more and 3 mm or less.

Figure 2:
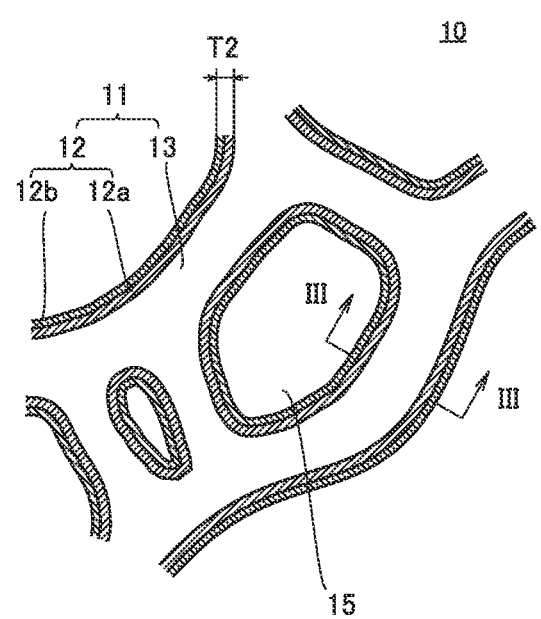
FIG. 2 is a schematic cross sectional view showing an inner structure of metal porous body 10.
Figure 3:
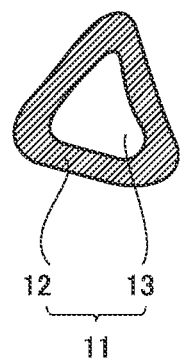
FIG. 3 is a schematic cross sectional view at III-III in FIG. 2.

FIG. 2 is a schematic cross sectional view showing an inner structure of metal porous body 10. FIG. 3 is a schematic cross sectional view at III-III in FIG. 2. As shown in FIGS. 2 and 3, metal porous body 10 has a metal framework 11.

Metal framework 11 has, for example, a three-dimensional mesh structure. Metal framework 11 is formed in one piece continuously. Metal framework 11 has a metal layer 12 and a hollow portion 13. Metal layer 12 is located at a surface of metal framework 11. Hollow portion 13 is located inside metal framework 11. That is, metal framework 11 is hollow inside. Metal framework 11 has, for example, a substantially triangular shape when viewed in a cross sectional view orthogonal to an extending direction of metal framework 11.

Metal layer 12 is composed of a metal material. Metal layer 12 is composed of, for example, a metal material having a Vickers hardness of 600 Hv or less. Metal layer 12 is preferably composed of a metal material having a Vickers hardness of 350 Hv or less, and is more preferably composed of a metal material having a Vickers hardness of 100 Hv or less. Metal layer 12 may be composed of a metal material having a Vickers hardness of 50 Hv or less. The Vickers hardness of metal layer 12 is measured in accordance with a Vickers hardness test method defined in JIS Z 2244. Specific examples of the metal material having a Vickers hardness of 600 Hv or less include tin (Sn), indium (In), nickel (Ni), silver (Ag), gold (Au), copper (Cu), and the like.

The Vickers hardness of nickel formed by non-bright electroplating is in a range of 100 Hv or more and 250 Hv or less, and the Vickers hardness of nickel formed by bright electroplating is in a range of 300 Hv or more and 350 Hv or less. The Vickers hardness of a nickel-cobalt alloy formed by plating is in a range of 300 Hv or more and 600 Hv or less. The Vickers hardness of tin or a tin alloy formed by plating is in a range of 3 Hv or more and 60 Hv or less. The Vickers hardness of indium or an indium alloy formed by plating is less than the Vickers hardness of tin or a tin alloy formed by plating. The Vickers hardnesses of copper, silver, and gold each formed by plating are in ranges of 40 Hv or more and 85 Hv or less, 55 Hv or more and 90 Hv or less, and 20 Hv or more and 80 Hv or less, respectively.

When metal layer 12 is composed of tin, a content of tin in metal layer 12 is preferably 99.9 mass % or more. When metal layer 12 is composed of tin, the content of tin in metal layer 12 is more preferably 99.99 mass % or more. In each of these cases, a remainder of metal layer 12 other than tin is carbon (C), nitrogen (N), sodium (Na), lead (Pb), bismuth (Bi), antimony (Sb), copper (Cu), iron (Fe), arsenic (As), zinc (Zn), or the like.

The content of tin in metal layer 12 is measured by the following method. First, metal porous body 10 is dissolved in a solution. This solution is, for example, a 1 mol/L hydrochloric acid solution having 1% nitric acid added therein. Second, the mass of tin in the solution is measured by performing an ICP (Inductively Coupled Plasma) analysis on the solution. The mass of tin in the solution is divided by the mass of metal porous body 10 dissolved in the solution, thereby obtaining the content of tin in metal layer 12.

When metal layer 12 is composed of tin, metal layer 12 may have a first layer 12a and a second layer 12b. First layer 12a is a layer on the hollow portion 13 side. Second layer 12b is located on the surface side of metal framework 11 (i.e., on the pore 15 side as described later). First layer 12a is, for example, a sputtering layer formed by sputtering. Second layer 12b is, for example, an electroplating layer formed by electroplating. Metal layer 12 may be constituted of an electroplating layer.

Metal layer 12 may be constituted of a plurality of calcined tin particles. In metal layer 12, the plurality of tin particles undergo necking with each other. First layer 12a may be a layer of a plurality of calcined tin particles, and second layer 12b may be an electroplating tin layer formed by electroplating.

The thickness of metal layer 12 is defined as a thickness T2. Thickness T2 is preferably 0.3 μm or more and 100 μm or less. In measurement of thickness T2, first, a cross sectional image of metal framework 11 orthogonal to the extending direction of metal framework 11 is obtained using a scanning electron microscope (SEM). Second, the thickness of metal layer 12 is measured based on the cross sectional image. On this occasion, the thickness of metal layer 12 is measured at a location at which the thickness is minimum in value. This measured value is thickness T2.

Figure 4:
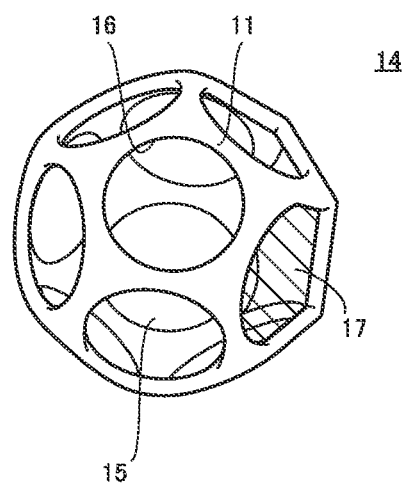
FIG. 4 is a schematic perspective view of a cell 14.

Metal porous body 10 is constituted of a plurality of cells 14. FIG. 4 is a schematic perspective view of a cell 14. FIG. 4 shows only one cell 14. As shown in FIG. 4, cell 14 has a polyhedral structure, and a portion corresponding to each side of the polyhedral structure is metal framework 11. The polyhedral structure of cell 14 is, for example, a dodecahedral structure. However, the polyhedral structure of cell 14 is not limited thereto. The polyhedral structure of cell 14 may be a cubic structure, an icosahedral structure, or the like.

Inside cell 14, a pore 15 defined by metal framework 11 exists. As described above, since metal porous body 10 is constituted of the plurality of cells 14, a plurality of pores 15 exist inside metal porous body 10.

Cell 14 is provided with a plurality of voids 16. Each of voids 16 is surrounded by metal framework 11. Void 16 communicates with pore 15. Therefore, pores 15 of two adjacent cells 14 are communicating pores. It should be noted that a location in which at least part of the plurality of voids 16 is closed by a separation wall 17 (see a portion provided with hatching in FIG. 4) exist in at least part of the plurality of cells 14. That is, separation wall 17 is disposed between two adjacent pores 15, and at least part of the plurality of pores 15 in metal porous body 10 is not a communicating pore. From another point of view, it can be said that a location in which an opening of a cell 14 of the plurality of cells 14 is closed by separation wall 17 exists inside metal porous body 10, the opening being defined by a side of a polyhedral shape of cell 14.

Separation wall 17 is formed in one piece with metal framework 11, and is composed of the same material as the material of metal framework 11. Further, separation wall 17 has the same structure as the structure of metal framework 11. That is, separation wall 17 is hollow inside and has a metal layer on its surface side.

The porosity of metal porous body 10 is, for example, 50% or more. The porosity of metal porous body 10 is calculated by $\{1-A/(B\times C)\}\times 100$, where A represents the weight of metal porous body 10, B represents the apparent volume of metal porous body 10, and C represents the true density of metal porous body 10.

The average diameter of pores 15 is, for example, 200 μm or more and 1000 μm or less. In measurement of the average diameter of pores 15, first, a cross sectional image of metal porous body 10 is obtained using an electron microscope. Second, in the cross sectional image, the number of cells 14 per inch (25.4 mm) is counted. A value obtained by dividing 25.4 mm by the number of counted cells 14 is the average diameter of pores 15.

(Method of Manufacturing Metal Porous Body 10)

Hereinafter, a method of manufacturing metal porous body 10 will be described.

Figure 5:
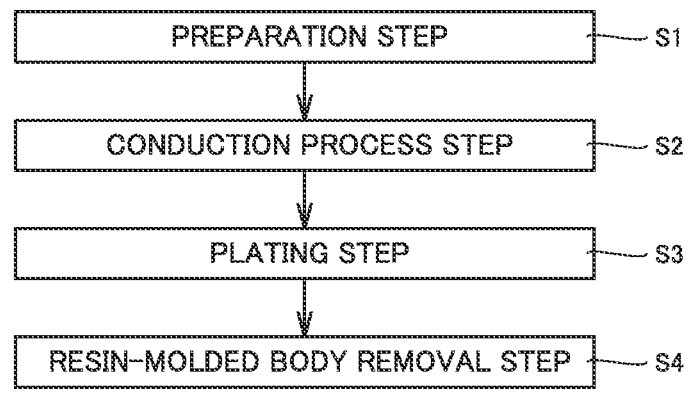
FIG. 5 is a flowchart showing a method of manufacturing metal porous body 10.

FIG. 5 is a flowchart showing a method of manufacturing metal porous body 10. As shown in FIG. 5, the method of manufacturing metal porous body 10 has a preparation step S1, a conduction process step S2, a plating step S3, and a resin-molded body removal step S4. Conduction process step S2 is performed after preparation step S1. Plating step S3 is performed after conduction process step S2. Resin-molded body removal step S4 is performed after plating step S3.

Figure 6:
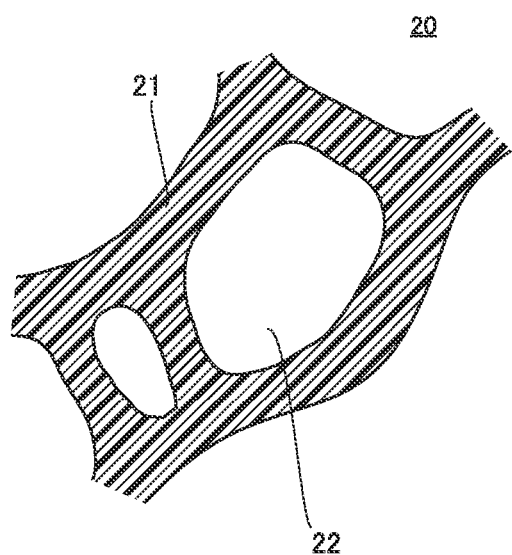
FIG. 6 is a schematic cross sectional view of a resin-molded body 20.

In preparation step S1, resin-molded body 20 is prepared. Resin-molded body 20 is a foamed resin. Resin-molded body 20 is composed of, for example, urethane or the like. FIG. 6 is a schematic cross sectional view of resin-molded body 20. As shown in FIG. 6, resin-molded body 20 has a framework 21. Framework 21 has a three-dimensional mesh structure. Framework 21 is solid. A plurality of pores 22 exist in resin-molded body 20. Each of pores 22 is defined by framework 21. Resin-molded body 20 is not subjected to a film removal process (for example, removal of a separation wall between two adjacent pores 22 by performing an explosion process). Therefore, part of the plurality of pores 22 is a communicating pore, but part of the plurality of pores 22 is not a communicating pore. It should be noted that the porosity of resin-molded body 20 and the average diameter of pores 22 are appropriately selected in accordance with the porosity of metal porous body 10 and the average diameter of pores 15.

It should be noted that even when the film removal process is performed, part of the plurality of pores 22 can be a communicating pore and part of the plurality of pores 22 can be avoided from being a communicating pore by appropriately adjusting a process condition for the film removal process.

In conduction process step S2, a conduction process is performed onto the surface of framework 21. This conduction process is performed, for example, by sputtering tin on the surface of framework 21. By performing the conduction process, a conductive layer is formed on the surface of framework 21. It should be noted that by performing the above conduction process, a conductive layer is also formed on the surface of the separation wall between two adjacent pores 22.

In plating step S3, electroplating is performed by applying a current to the conductive layer formed in conduction process step S2, thereby forming an electroplating layer on the conductive layer.

In resin-molded body removal step S4, resin-molded body 20 is removed. Resin-molded body 20 is dissolved and removed using an ionic liquid (for example, diethanolamine) at a temperature (for example, 175° C. when each of the conductive layer and the plating layer is composed of tin) less than the melting point of each of the constituent materials of the conductive layer and the plating layer, for example. After removing resin-molded body 20, the conductive layer and the plating layer become metal layer 12 (separation wall 17).

It should be noted that when the melting point of each of the constituent materials of the conductive layer and the plating layer is high, resin-molded body 20 may be decomposed and removed by heating. On this occasion, the conductive layer and the plating layer are oxidized, so that a reduction process is performed in a reduction atmosphere (for example, in a hydrogen atmosphere) after resin-molded body 20 is removed.

Conduction process step S2 may be performed, for example, by applying carbon to the surface of framework 21. In this case, only the plating layer formed in plating step S3 constitutes metal layer 12.

Figure 7:
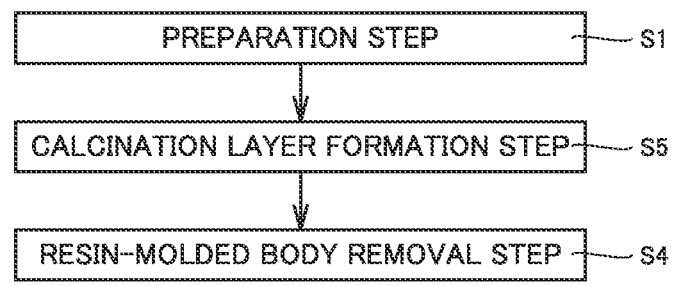
FIG. 7 is a flowchart showing a method of manufacturing metal porous body 10 according to a modification 1.

The method of manufacturing metal porous body 10 may not include conduction process step S2 and plating step S3. FIG. 7 is a flowchart showing a method of manufacturing metal porous body 10 according to a modification 1. As shown in FIG. 7, a calcination layer formation step S5 may be performed instead of conduction process step S2 and plating step S3.

In calcination layer formation step S5, first, a paste including tin particles and a binder is applied on the surface of framework 21 and on the surface of the separation wall between two adjacent pores 22. The binder is, for example, carboxymethyl cellulose (CMC). Second, the applied paste is calcined. This calcination is performed at a temperature less than the melting point of tin. Thus, adjacent tin particles in the applied paste undergo necking to attain metallic bond, with the result that the applied paste becomes a layer of calcined tin particles. The layer of calcined tin particles becomes metal layer 12 (separation wall 17) after resin-molded body removal step S4.

Figure 8:
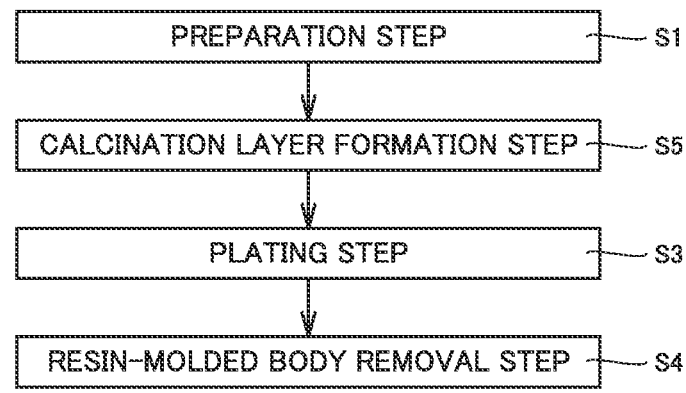
FIG. 8 is a flowchart showing a method of manufacturing metal porous body 10 according to a modification 2.

FIG. 8 is a flowchart showing a method of manufacturing metal porous body 10 according to a modification 2. As shown in FIG. 8, the method of manufacturing metal porous body 10 may have a calcination layer formation step S5 instead of conduction process step S2. In this case, a layer of calcined tin particles becomes a conductive layer, and in plating step S3, electroplating is performed by applying a current to the layer of calcined tin particles. In this case, after resin-molded body removal step S4, the layer of calcined tin particles and the plating layer formed in plating step S3 become metal layer 12 (separation wall 17).

(Effects of Metal Porous Body 10)

Effects of metal porous body 10 will be described below in comparison with a comparative example. A metal porous body according to the comparative example is referred to as a metal porous body 10A. The configuration of metal porous body 10A is the same as the configuration of metal porous body 10 except that metal porous body 10A does not have separation wall 17. That is, the configuration of metal porous body 10A is the same as the configuration of metal porous body 10 except that the whole of pores 15 are communicating pores.

In metal porous body 10A, when a load is applied from outside, the load is supported only by metal framework 11. Therefore, metal porous body 10A is likely to be deformed by such a load from outside, and may have a low rigidity. On the other hand, in metal porous body 10, when a load is applied from outside, the load is supported not only by metal framework 11 but also by separation wall 17, with the result that metal porous body 10 is less likely to be deformed by the load. Therefore, according to metal porous body 10, rigidity is improved.

In particular, when metal framework 11 is composed of a metal material having a Vickers hardness of 50 Hv or less, metal porous body 10A may not become self-supported because the rigidity is too low. In metal porous body 10, the rigidity is improved by separation wall 17, with the result that even when metal framework 11 is composed of a metal material having a Vickers hardness of 50 Hv or less, metal framework 11 can be self-supported.

In metal porous body 10A, the whole of pores 15 are communicating pores. Therefore, when metal porous body 10A is used as a sound insulating material, a sound insulating effect of metal porous body 10A may be insufficient. On the other hand, separation wall 17 exists inside metal porous body 10, a sound wave is likely to be blocked by separation wall 17, thereby improving a sound insulating effect when used as a sound insulating material.

Metal porous body 10 may be used as a negative electrode of a nickel-zinc battery or a zinc-air battery. When the content of tin in each of metal framework 11 and separation wall 17 is 99.9 mass % or more (99.999 mass % or more), a hydrogen overvoltage of tin is large, with the result that hydrogen is less likely to be generated as a side reaction on a surface of a negative electrode during an operation of the battery. Further, in this case, since metal framework 11 is substantially composed of tin, starting points of generation of zinc dendrite are reduced in the surface of the negative electrode, thereby suppressing generation of zinc dendrite.

Examples

Each of samples 1 to 3 was prepared as a sample of a nickel-zinc battery. A metal porous body (nickel porous body) composed of nickel was used for a positive electrode of each of samples 1 to 3. Inside of the nickel porous body was filled with a positive electrode active material slurry. The composition of the positive electrode active material slurry after drying was as follows: 90 mass % of nickel hydroxide, 7 mass % of cobalt hydroxide, 0.3 mass % of CMC, and 2.7 mass % of SBR (styrene butadiene rubber). A solid content in the positive electrode active material was 78 mass %.

First, in the production of the positive electrode of each of samples 1 to 3, a nickel porous body having a thickness of 1.2 mm and a metal amount of 300 g/m² was prepared. Second, the thickness thereof was adjusted by roll press, and the inside of the nickel porous body was filled with a positive electrode active material slurry. Third, the nickel porous body filled with the positive electrode active material slurry was dried at 100° C. and then was subjected to roll press, thereby attaining densification. As a result, a positive electrode was obtained which had an electrode area of 30 mm×30 mm, a thickness of 0.45 mm, and a computationally determined capacity of 240 mAh. It should be noted that a lead composed of nickel was attached to the positive electrode by welding.

A metal porous body (copper porous body) composed of copper was used for the negative electrode of sample 1, a metal porous body (tin-plated copper porous body) composed of copper and having a surface plated with tin was used for the negative electrode of sample 2, and a metal porous body 10 having a metal framework 11 in which a content of tin was 99.99 mass % or more was used for the negative electrode of sample 3. The metal porous body of each of samples 1 to 3 had a metal amount of 200 g/m² and a thickness of 1.0 mm. The metal porous bodies of samples 1 to 3 had porosities of 97.8%, 97.8%, and 97.2%, respectively. The metal porous bodies used in samples 1 to 3 are shown in Table 1.

In each of samples 1 to 3, the inside of the metal porous body was filled with a negative electrode active material slurry. The composition of the negative electrode active material slurry after drying was as follows: 90 mass % of zinc oxide, 5 mass % of AB (acetylene black), 0.5 mass % of CMC, 1.5 mass % of PTFE (polytetrafluoroethylene), and 3 mass % of SBR. A solid content in the negative electrode active material was 60 mass %.

TABLE 1

| Sample | Metal Porous Body Used for Negative Electrode | Metal Amount (g/m²) | Thickness (mm) | Porosity (%) |
|---|---|---|---|---|
| 1 | Copper Porous Body | 200 | 1.0 | 97.8 |
| 2 | Tin-Plated Copper Porous Body | 200 | 1.0 | 97.8 |
| 3 | Metal Porous Body 10 | 200 | 1.0 | 97.2 |

First, in the production of the negative electrode of each of samples 1 to 3, the porous body shown in Table 2 was prepared. Second, the thickness thereof was adjusted by roll press, the inside of the metal porous body was filled with the negative electrode active material slurry. Third, the metal porous body filled with the negative electrode active material slurry was dried at 100° C. and then was subjected to roll press, thereby attaining densification. As a result, a negative electrode was obtained which had an electrode area of 30 mm×30 mm and a computationally determined capacity of 400 mAh. It should be noted that a lead composed of nickel was attached to the negative electrode by welding.

In each of samples 1 to 3, an anion conductive membrane having a thickness of 150 μm was interposed as a separator between the positive electrode and the negative electrode, thereby forming an electrode group. The electrode group was placed in a pouch composed of polypropylene, and the pouch was sandwiched and fixed by acrylic plates from outside. As an electrolyte solution, a 1 mol/L potassium hydroxide aqueous solution having zinc oxide dissolved and saturated therein was used. In the pouch, the electrolyte solution was supplied until the electrode group was completely immersed, and the electrode group was impregnated therewith through decompression.

Each of samples 1 to 3 was activated prior to evaluation. In this activation, first, a cycle of performing charging to 1.9 V at 0.1 C and then performing discharging to 1.5 V at 0.1 C was repeated three times. Second, a cycle of performing charging to 1.9 V at 0.2 C and then performing discharging to 1.5 V at 0.2 C was repeated three times. Third, a cycle of performing charging to 1.9 V at 0.5 C and then performing discharging to 1.5 V at 0.5 C was repeated three times.

As a first test, discharging capacities of the negative electrodes of samples 1 to 3 were compared. In the first test, charging was performed to 1.9 V at 0.5 C in a thermostatic chamber at 30° C. A cutoff during CV was 5 hours or 10 mA in current value. In the first test, discharging was performed at 0.2 C, 0.5 C and 1 C until 1.5 V was reached.

Results of the first test are shown in Table 2. The discharging capacity shown in Table 2 was an average value with N=5. As shown in Table 2, it was confirmed that sample 3 is operated normally.

TABLE 2

| Sample | 0.2 C Capacity (mAh) | 0.5 C Capacity (mAh) | 1 C Capacity (mAh) |
|---|---|---|---|
| 1 | 231 | 217 | 192 |
| 2 | 230 | 215 | 193 |
| 3 | 230 | 216 | 191 |

As a second test, a self-discharging characteristic of the negative electrode of each of samples 1 to 3 was evaluated. In the second test, each of samples 1 to 3 was charged in the same manner as in the first test. After completion of the charging, each of samples 1 to 3 was stored in a thermostatic chamber at 45° C. for 15 days. After this storage, each of samples 1 to 3 was discharged to 1.5 V at 0.2 C and a remaining capacity was compared.

Results of the second test are shown in Table 3. The remaining capacity shown in Table 3 was an average value with N=5. As shown in Table 3, the remaining capacity of sample 3 was more than the remaining capacity of sample 1 and the remaining capacity of sample 2. In view of this, it was confirmed that an excellent self-discharging characteristic is exhibited by using, as the negative electrode of the nickel-zinc battery, metal porous body 10 having metal framework 11 in which the content of tin is 99.99 mass % or more.

TABLE 3

| Sample | Remaining Capacity (mAh) |
|---|---|
| 1 | 186 |
| 2 | 207 |
| 3 | 213 |

Figure 9:
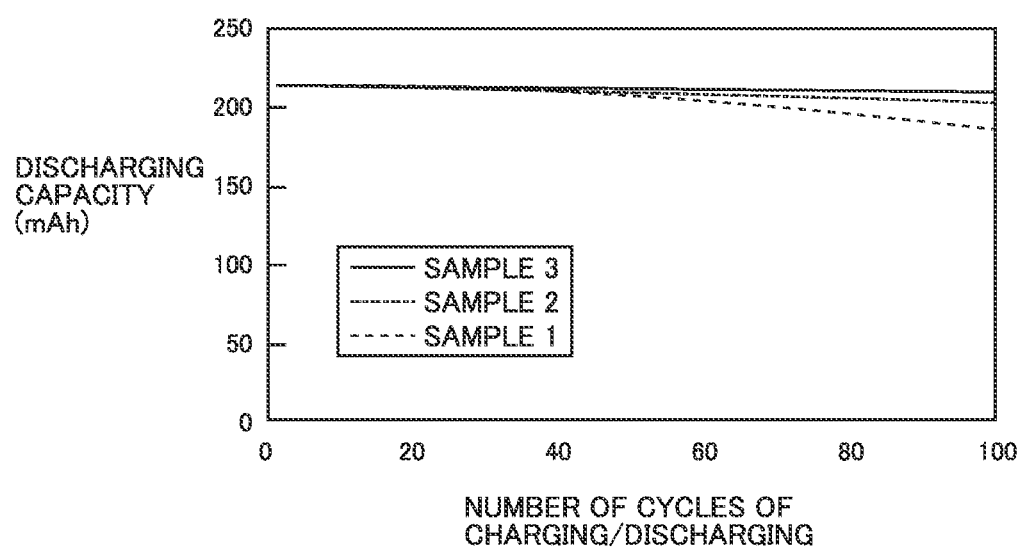
FIG. 9 is a graph showing a relation between the number of cycles of charging/discharging and a discharging capacity in each of samples 1 to 3.

Further, as a third test, a cycle characteristic of the negative electrode of each of samples 1 to 3 was evaluated. In the third test, the charging in the same manner as in the first test and the discharging at 0.5 C until 1.5 V was reached were repeated. FIG. 9 is a graph showing a relation between the number of cycles of charging/discharging and a discharging capacity in each of samples 1 to 3. A value shown in the graph of FIG. 9 is an average value with N=5. As shown in FIG. 9, in sample 3, a decrease in discharging capacity due to an increase in the number of cycles of charging/discharging was the smallest as compared with samples 1 and 2. In view of this, it was confirmed that an excellent cycle characteristic was exhibited by using, as the negative electrode of the nickel-zinc battery, metal porous body 10 having metal framework 11 in which the content of tin is 99.99 mass % or more.

In order to evaluate an influence of presence or absence of separation wall 17 over a strength of the metal porous body, samples 4 and 5 were prepared. In the preparation of each of samples 4 and 5, first, a foamed polyurethane sheet was prepared. The thickness of the foamed polyurethane sheet was 1 mm, and the number of cells per inch in the foamed polyurethane sheet was 53 or more and 58 or less. The foamed polyurethane sheet used in sample 4 was subjected to a film removal process, and the foamed polyurethane sheet used in sample 5 was not subjected to the film removal process.

Second, sputtering of tin was performed onto the foamed polyurethane sheet as conduction process step S2. The sputtering was performed to form a sputtered film having a thickness of 1 μm. Third, as plating step S3, tin plating was performed onto the foamed polyurethane sheet in an organic acid tin plating bath so as to attain a metal amount of 200 g/m². Fourth, as resin-molded body removal step S4, the foamed polyurethane sheet was dissolved and removed by immersing the foamed polyurethane sheet in diethanolamine at 175° C. for 15 minutes.

As described above, since the foamed polyurethane sheet used in sample 4 was subjected to the film removal process whereas the foamed polyurethane sheet used in sample 5 was not subjected to the film removal process, sample 4 did not have separation wall 17 and sample 5 had separation wall 17. Details of samples 4 and 5 are shown in Table 4. It should be noted that the porosity of each of samples 4 and 5 was 97.2%.

TABLE 4

| Sample | Metal Amount (g/m²) | Thickness (mm) | Porosity (%) | Tensile Strength (MPa) |
|---|---|---|---|---|
| 4 | 200 | 1 | 97.2 | 0.17 |
| 5 | 200 | 1 | 97.2 | 0.25 |

A tensile strength of each of samples 4 and 5 was measured by the following method. First, each sample was processed into a test piece with 20 mm in width×70 mm in length×1 mm in thickness. Second, the test piece was subjected to a tensile test using a tensile tester. In the tensile test, a load was applied along a length direction of each sample. Third, the tensile strength of each sample was calculated by dividing the maximum tensile load, which was obtained as a result of the tensile test, by the apparent cross sectional area of the test piece (20 mm×1 mm=20 mm²). Tensile strengths of samples 4 and 5 are also shown in Table 4. The tensile strength of sample 5 was higher than the tensile strength of sample 4. In view of this comparison, it was confirmed that since the metal porous body has separation wall 17, the tensile strength of the metal porous body was improved.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 10, 10A: metal porous body; 11: metal framework; 12: metal layer; 12a: first layer; 12b: second layer; 13: hollow portion; 14: cell; 15: pore; 16: void; 17: separation wall; 20: resin-molded body; 21: framework; 22: pore; S1: preparation step; S2: conduction process step; S3: plating step; S4: resin-molded body removal step; S5: calcination layer formation step; T1, T2 thickness.

The invention claimed is:

1. A metal porous body comprising:
a metal framework;
a separation wall formed in one piece with the metal framework, the separation wall being composed of a same material as a material of the metal framework;
a plurality of cells each having a polyhedral shape exist inside the metal porous body, wherein a side of the polyhedral shape is constituted of the metal framework; and
a closed cell in which an opening of a cell of the plurality of cells is closed by the separation wall exists inside the metal porous body, the opening being defined by a side of the polyhedral shape of adjacent cells among the plurality of cells, wherein the separation wall is integrally formed with the metal framework so as to completely close the opening, such that the closed cell is non-communicating with the adjacent cells.

2. The metal porous body according to claim 1, wherein a metal layer of the metal framework is composed of a metal material having a Vickers hardness of less than 600 Hv.

3. The metal porous body according to claim 1, wherein a metal layer of the metal framework is composed of a metal material having a Vickers hardness of 350 Hv or less.

4. The metal porous body according to claim 1, wherein a metal layer of the metal framework is composed of a metal material having a Vickers hardness of 100 Hv or less.

5. The metal porous body according to claim 2, wherein a thickness of the metal layer is 0.3 µm or more and 10 µm or less.

6. The metal porous body according to claim 2, wherein the metal framework is composed of tin and a content of the tin is 99.99 mass % or more.

7. The metal porous body according to claim 1, wherein a metal layer of the metal framework is constituted of a layer of calcined tin particles.

8. The metal porous body according to claim 1, wherein the metal framework and the separation wall form a continuous, unitary metallic structure within an interior region of the metal porous body.

* * * * *